(12) United States Patent
Wang et al.

(10) Patent No.: US 11,604,095 B1
(45) Date of Patent: Mar. 14, 2023

(54) THIN-FILM FILTER BASED HYPERSPECTRAL IMAGER SPANNING AN OCTAVE OF LONG WAVELENGTH INFRARED REGIME

(71) Applicant: HRL Laboratories, LLC, Malibu, CA (US)

(72) Inventors: Shuoqin Wang, Oak Park, CA (US); Joseph Nedy, Santa Monica, CA (US); Brett Z. Nosho, Santa Monica, CA (US); Minh B. Nguyen, Thousand Oaks, CA (US)

(73) Assignee: HRL LABORATORIES, LLC, Malibu, CA (US)

(*) Notice: Subject to any disclaimer, the term of this patent is extended or adjusted under 35 U.S.C. 154(b) by 324 days.

(21) Appl. No.: 15/931,015

(22) Filed: May 13, 2020

Related U.S. Application Data

(60) Provisional application No. 62/874,174, filed on Jul. 15, 2019.

(51) Int. Cl.
| | | |
|---|---|---|
| *G01J 3/14* | (2006.01) | |
| *G02B 5/20* | (2006.01) | |
| *G02B 5/28* | (2006.01) | |
| *G01J 3/12* | (2006.01) | |
| *G01J 3/28* | (2006.01) | |
| *G01J 3/02* | (2006.01) | |
| *G02B 1/115* | (2015.01) | |

(52) U.S. Cl.
CPC ........... *G01J 3/2823* (2013.01); *G01J 3/0208* (2013.01); *G01J 3/14* (2013.01); *G02B 1/115* (2013.01); *G02B 5/207* (2013.01); *G02B 5/284* (2013.01); *G01J 2003/1213* (2013.01)

(58) Field of Classification Search
CPC .......... G01J 3/2823; G01J 3/0208; G01J 3/14; G01J 2003/1213; G02B 1/115; G02B 5/207; G02B 5/284
See application file for complete search history.

(56) References Cited

U.S. PATENT DOCUMENTS

| | | | |
|---|---|---|---|
| 5,144,498 A * | 9/1992 | Vincent | G01J 3/26 359/359 |
| 6,112,005 A * | 8/2000 | Liu | G02B 5/288 359/590 |
| 2009/0236525 A1* | 9/2009 | Mitra | G01J 3/2823 356/519 |

(Continued)

OTHER PUBLICATIONS

Lucey et al. ("A Compact LWIR Hyperspectral System Employing a Microbolometer Array and a Variable Gap Fabry-Perot Interferometer Employed as a Fourier Transform Spectrometer", SPIE 8390, Algorithms and Tech. for Multispectral, Hyperspectral, and Ultraspectral Imagery XVIII, 83900R, May 8, 2012) (Year: 2012).*

*Primary Examiner* — Hina F Ayub
(74) *Attorney, Agent, or Firm* — Ladas & Parry, LLP

(57) ABSTRACT

A hyperspectral imager (HSI) includes a first thin film filter, the first thin film filter including a first quarter wave mirror, a second quarter wave mirror, and a low-refractive-index wedge between the first quarter wave mirror and the second quarter wave mirror. The low-refractive-index wedge has a height dimension such that a distance between the first quarter wave mirror and the second quarter wave mirror increases linearly along a length of the low-refractive-index wedge.

15 Claims, 11 Drawing Sheets

(56) References Cited

U.S. PATENT DOCUMENTS

| | | | |
|---|---|---|---|
| 2011/0228279 A1* | 9/2011 | Lucey | G01J 3/14 |
| | | | 356/454 |
| 2013/0182954 A1* | 7/2013 | Pellegrini | G06V 10/7715 |
| | | | 382/170 |
| 2017/0033261 A1* | 2/2017 | Kim | H01L 31/035272 |
| 2017/0059408 A1* | 3/2017 | Körner | G01J 3/26 |
| 2022/0119696 A1* | 4/2022 | Shin | B32B 9/04 |

* cited by examiner

| Approaches | Highlights | Comments on applying to LWIR HSI |
|---|---|---|
| MEMs based tunable Fabry-Perot filter (closest prior art) | LWIR (8-10um) HSI demonstrated by Teledyne. | Gap control is difficult and complex. Snap-shot (2D spatial), the spectra of each pixel is scanned via controlling the air gap |
| FTIR Acousto-optical tunable filter Liquid crystal tunable filter | Telops built a FTIR based LWIR (8-12um) imager on the 320*256 FPA with resolution <120nm | Snap shots of the whole scene. Spectra is acquired with sequential scans. Similar issues of size, weight, and cost as grating based |
| Flying wheel | 21 channel 6-18um high resolution radiometer is assembled on NASA earth observation system chemistry mission satellite | Similar issues of size, weight, and cost as grating based. Not scalable to HSI. |
| Plenoptic light field spectroscopy | Capable of 4D (spatial + depth + spectral) HSI | The color filter is located at the focal plane instead of the image plane. Rely on post-processing for depth information and color correction |
| Subwavelength grating reflector | Subwavelength grating reflector based on imprint lithography reduces cost of optical coatings of quarter-wave layers | Preliminary results shows low finesse, hence resolution issue, but promising |
| Mosaic structure | Multispectral filter array is built by U.Delaware & ARL with 2-D metal-dielectric-metal grating | Promise for snap-shot of 3-D data without moving parts. Not scalable to HSI. Rely on post-processing for spatial recovery. |

FIG. 1

PRIOR ART

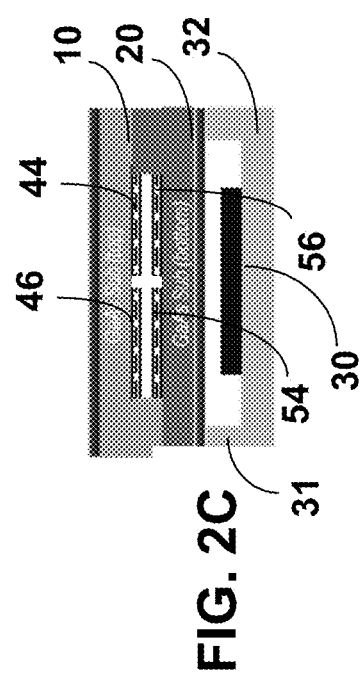

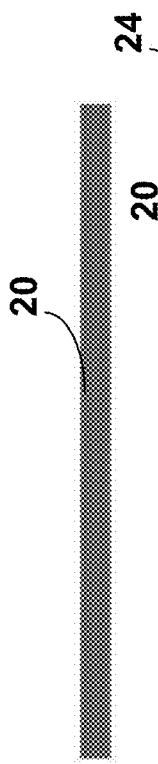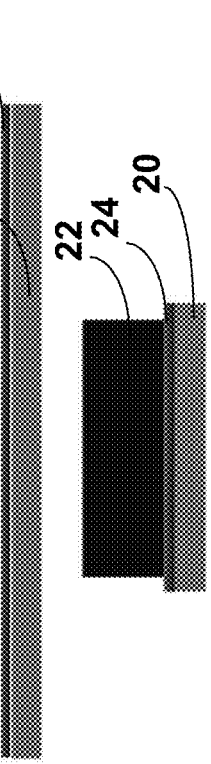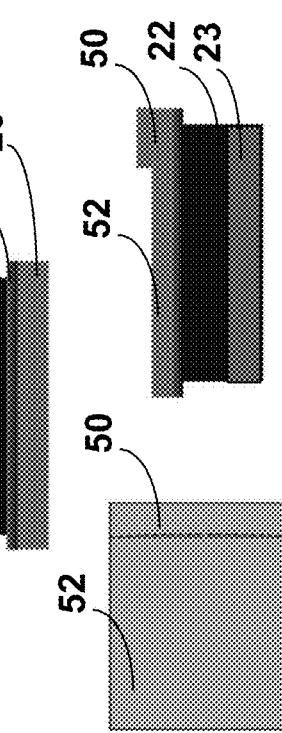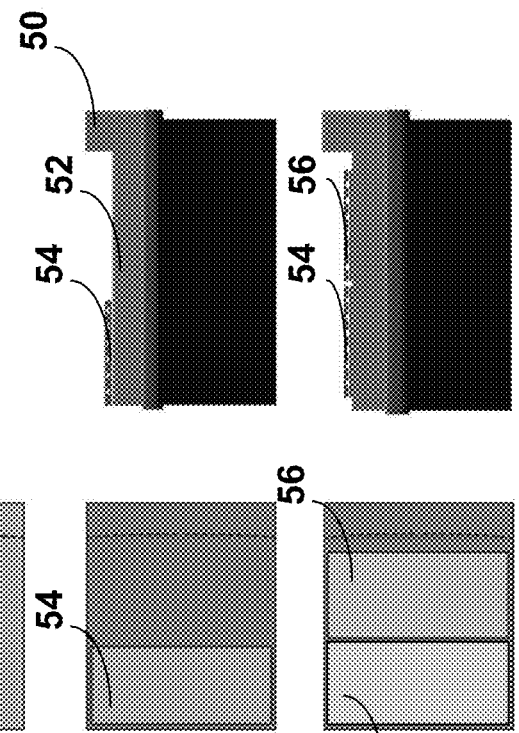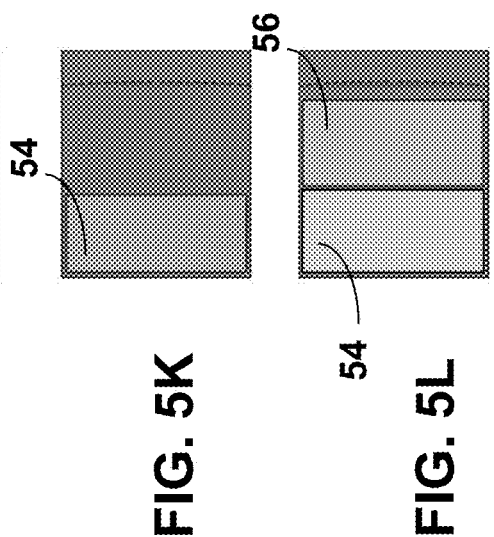
FIG. 5G  FIG. 5H  FIG. 5I  FIG. 5J  FIG. 5K  FIG. 5L

| Layer names | layer (single panel) nm | Left Q-W nm | Right Q-W nm |
|---|---|---|---|
| GaAs Substrate (300~600 um thick) | | | |
| ZnS | 1942 | 1650.7 | 2330.4 |
| Ge | 953 | 810.05 | 1143.6 |
| ZnS | 1515 | 1287.75 | 1818 |
| Ge | 1008 | 856.8 | 1209.6 |
| ZnS | 1026 | 872.1 | 1231.2 |
| Ge | 572 | 482.2 | 686.4 |
| ZnS | 1109 | 942.65 | |
| Ge | 584 | 496.4 | |
| ZnS | 1231 | 1046.35 | |
| Total (nm) | 9940 | 8445 | 8419.2 |
| Center Wavelength (um) | 10.3 | 8.755 | 12.36 |
| Wavelength range (um) | | 6.755~10.755 | 10.36~14.36 |

FIG. 6

| Factors | Normalized FWHM ($\Delta\lambda/\lambda_c$) | Typical Values of ($\Delta\lambda/\lambda_c$) |
|---|---|---|
| Limited Reflectance (R) | $\dfrac{1-R}{\pi\sqrt{R}}$ | ~1% with $R = 0.97$ |
| Curvature/Roughness/Tilt ($\delta d$) | $\dfrac{\delta d}{b\lambda_c}$<br>$b = 0.2, 0.5, 0.58$<br>at curvature, tilt and roughness defects | ~1% with $\delta d = 50nm$, $b = 0.5$, $\lambda_c = 10um$ |
| F# | $\dfrac{1}{b(F\#)^2}$<br>$b = 2$ at two sides; $b = 8$ at center | ~1% with $b = 2$, $F\# = 7$ |
| Distance Away From image plane (D) | $\dfrac{D\phi}{2F\#d}$<br>$\phi$ is the tilt angle of the gap,<br>$d$ is the thickness of the air gap | ~1% with $D = 3mm$, $\phi = 10^{-4}$, $F\# = 7$, $d = 5um$ |

The overall normalized FWHM $(\Delta\lambda/\lambda_c) = \sqrt{\sum\left(\dfrac{\Delta\lambda}{\lambda_c}\right)_i^2}$

FIG. 7

THIN-FILM FILTER BASED HYPERSPECTRAL IMAGER SPANNING AN OCTAVE OF LONG WAVELENGTH INFRARED REGIME

CROSS REFERENCE TO RELATED APPLICATIONS

This application is related to and claims the benefit of U.S. Provisional Patent Application No. 62/874,174, filed on Jul. 15, 2019, which is incorporated herein by reference as though set forth in full.

STATEMENT REGARDING FEDERAL FUNDING

None

TECHNICAL FIELD

This disclosure relates to hyperspectral imagers.

BACKGROUND

A hyperspectral imager (HSI) can generate one additional dimension of spectral information beyond a conventional camera that provides two dimensional (2-D) spatial information enabling many potential applications. Grating/prism based HSIs can provide high resolution $$\left(\frac{\delta\lambda}{\lambda_0} < 1\%\right)$$

spectral information and dominate the market of many applications. However, there are emerging markets where a compact and less expensive HSI camera is much more desirable, such as for lightweight unmanned aerial vehicles (UAVs) or handheld equipment. New camera concepts such as thin-film filter-based HSIs are being developed for such needs.

There is no prior art thin-film filter based HSI that covers an octave spectrum of LWIR. Instead grating/prism based HSIs are used, which require high voltage to operate, and suffer from vibration, mechanical instability, misalignment, distortion, thermal self-emission, and weight. In addition, grating/prism based HSIs may cost up to $1M.

FIG. 1 shows a table describing prior art approaches, their features and their disadvantages. The prior art approaches include: a MEMs based tunable Fabry-Perot filter, which is the closest prior art to the present invention; FTIR, acousto-optical tunable filter, and liquid crystal tunable filter; flying wheel; plenoptic light field spectroscopy; subwavelength grating reflector; and mosaic structure.

What is needed is an improved hyperspectral imager (HSI). The embodiments of the present disclosure answer these and other needs.

SUMMARY

In a first embodiment disclosed herein, a hyperspectral imager (HSI) comprises a first thin film filter, the first thin film filter comprising a first quarter wave mirror, a second quarter wave mirror, and a low-refractive-index wedge between the first quarter wave mirror and the second quarter wave mirror, wherein the low-refractive-index wedge has a height dimension such that a distance between the first quarter wave mirror and the second quarter wave mirror increases linearly along a length of the low-refractive-index wedge.

In another embodiment disclosed herein a method for providing a hyperspectral imager (HSI) comprises providing a first thin film filter, the method of providing a first thin film filter comprising providing a first quarter wave mirror, providing a second quarter wave mirror, and providing a low-refractive-index wedge between the first quarter wave mirror and the second quarter wave mirror, wherein the low-refractive-index wedge has a height dimension such that a distance between the first quarter wave mirror and the second quarter wave mirror increases linearly along a length of the low-refractive-index wedge.

In yet another embodiment disclosed herein a method for providing a hyperspectral imager (HSI) comprises providing a first substrate, thinning a first portion of the first substrate, wherein the first portion of the first substrate after thinning is lower than a second portion of the first substrate by a first depth, coating a left side of the first portion of the first substrate with a first plurality of layers, wherein the first plurality of layers comprise a first set of first material layers having a respective set of first thicknesses interleaved with a first set of second material layers having a respective set of second thicknesses, coating a right side of the first portion of the first substrate with a second plurality of layers, wherein the second plurality of layers comprise a second set of first material layers having a respective set of third thicknesses interleaved with a second set of second material layers having a respective set of fourth thicknesses, providing a second substrate, thinning a first portion of the second substrate, wherein the first portion of the second substrate after thinning is lower than a second portion of the second substrate by a second depth, coating a left side of the first portion of the second substrate with a third plurality of layers, wherein the third plurality of layers comprise a third set of first material layers having a respective set of fifth thicknesses interleaved with a third set of second material layers having a respective set of sixth thicknesses, coating a right side of the first portion of the second substrate with a fourth plurality of layers, wherein the fourth plurality of layers comprise a fourth set of first material layers having a respective set of seventh thicknesses interleaved with a fourth set of second material layers having a respective set of eighth thicknesses, bonding the second portion of the first substrate to the first portion of the second substrate and bonding the second portion of the second substrate to the first portion of the first substrate to form a thin film filter, and attaching the thin film filter over a focal plane array, wherein the first set of thicknesses and the seventh set of thicknesses are the same, the second set of thicknesses and the eighth set of thicknesses are the same, the third set of thicknesses and the fifth set of thicknesses are the same, and the fourth set of thicknesses and the sixth set of thicknesses are the same, wherein the first depth is less than the second depth, and wherein a low-refractive index wedge is formed between the first substrate and the second substrate upon bonding the first substrate to the second substrate.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 shows a table describing related prior art, describing the approaches, highlights and comments relative to applying the prior art to LWIR HSI;

FIG. 2A shows a top view of a line-scanned LWIR HSI with a focal plane array inside a leadless chip carrier (LCC), FIG. 2B shows a cross-section of the HSI of FIG. 2A, and FIG. 2C, which is the same as FIG. 5O shows another HSI with two filters to cover a wide wavelength range in accordance with the present disclosure;

FIGS. 5A, 5B, 5C, 5D, 5E, 5F, 5G, 5H, 5I, 5J, 5K, 5L, 5M, 5N, and 5O show a process for fabricating a HSI in accordance with the present disclosure;

FIG. 6 shows example parameters for quarter-wave mirrors in accordance with the present disclosure; and FIG. 7 shows a table showing for each factor in the left column the effect on the spectral resolution shown in the middle column, and a quantitative estimation on the constraints of each factor shown in the right column in accordance with the present disclosure.

DETAILED DESCRIPTION

Figure 2A:
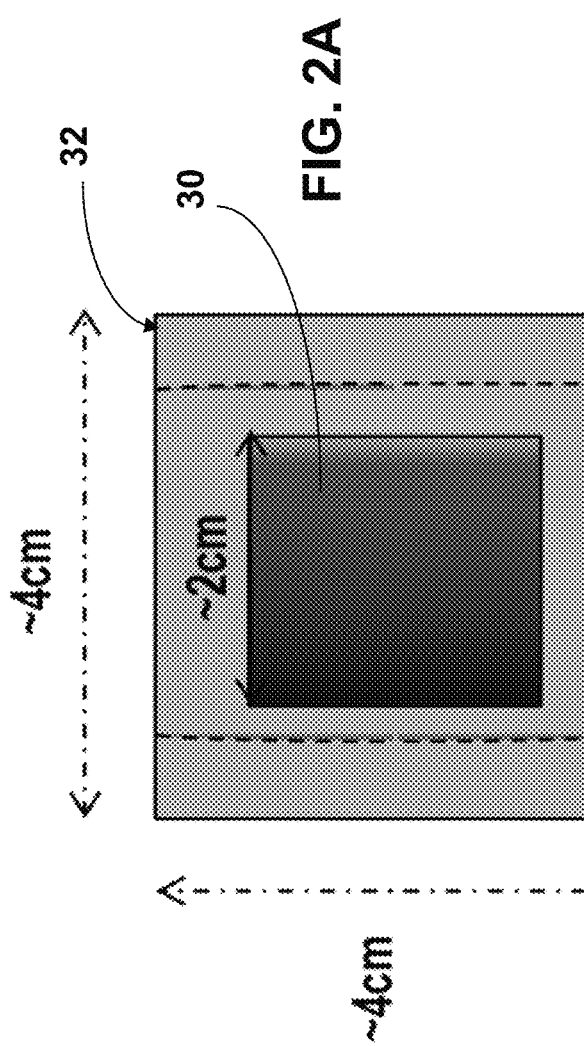
FIGS. 2A and 2B show a line-scanned LWIR HSI.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure describes a wide spectrum hyperspectral imager (HSI) that is based on thin-film filtering techniques. In comparison with prior art thin-film filter based designs, the thin-film filter design of the present disclosure covers a span of one octave of long wavelength infrared (LWIR), for example, 7 µm to 14 µm. The HSI is designed so that it may be compatibly integrated with a LWIR focal plane array (FPA). Spanning one octave enables the HSI sensor to access the entire LWIR atmospheric transmission band (7 µm to 14 µm).

The core item of the HSI of the present disclosure is the filter, which includes a low-refractive-index wedge 33, which is also referred to as an airgap in the description below, for the non-limiting embodiment in which the low-refractive-index wedge is comprised of air. The low-refractive-index wedge 33 is sandwiched between two quarter-wave mirrors 16 and 26, as shown in FIG. 2B. The low-refractive-index wedge 33 and the two quarter-wave mirrors 16 and 26 are between a top GaAs substrate 10 and a bottom GaAs substrate 20. The top GaAs substrate 10 and the bottom GaAs substrate 20 are preferably the same thickness and can have a thickness ranging from 0.3 to 0.6 mm. An anti-reflection (AR) layer 14 is on top of the filter and is coated on the top GaAs substrate 10. Another anti-reflection (AR) layer 24 is on the bottom of the filter and is coated on the bottom GaAs substrate 20. The filter is attached to the top 31 of a leadless ceramic carrier (LCC) 32. Inside of a cavity 35 of the LCC 32 and covered and overlapped by the filter is a focal plane array (FPA) 30. Following is a more detailed description of the quarter-wave mirrors 16 and 26 and the wedge 33, which are designed for covering an octave of LWIR spectrum.

Preferably for the present invention, infrared materials germanium (Ge) and zinc sulfide (ZnS) are used for the quarter-wave mirrors 16 and 26. Ge and ZnS have a refractive index of 4.65 and 2.34, respectively. A quarter-wave mirror has a center wavelength determined by the thickness of the Ge 70 and ZnS 72 layers on a substrate 74, which may be GaAs, as shown in FIG. 6. The range of wavelengths is determined by the refractive index contrast:

$$\frac{\Delta \lambda}{\lambda_c} = \frac{4}{\pi}\sin^{-1}\left(\frac{n_H - n_L}{n_H + n_L}\right),$$

where $n_H$ is a refractive index of the Ge thin film layers and $n_L$ is a refractive index for the ZnS thin film layers.

Given Ge 70 and ZnS 72 materials for the layers, and the layer thicknesses as shown in the second column 76 of FIG. 6, the quarter wave mirror has an estimated range of wavelength of about $\Delta\lambda$=4.3 µm with a center wavelength of about $\lambda_c$=10 µm. To verify this estimation, the transmission of a HSI was simulated that included two identical quarter-wave mirrors sandwiching an airgap. The layer thicknesses of each quarter-wave mirror in the simulation were as shown in the second column 76 of FIG. 6. The simulated transmissions as a function of wavelength, at nine different airgap widths 33 between two quarter wave mirrors 16 and 26, namely airgap widths of 4 µm, 4.5 µm, 5 µm, 5.5 µm, 6.0 µm, 6.5 µm, 7 µm, 7.5 µm, and 8 µm, are plotted in FIG. 3.

To achieve this range of airgap widths, a low-refractive-index wedge 33, which may be air, is between the quarter wave mirrors 16 and 26, as shown in FIG. 2B. As shown in FIG. 2B the gap between the quarter wave mirrors 16 and 26 varies from $h_L$=3 µm on the left side of the low-refractive-index wedge 33, as shown by reference number 12, to $h_R$=8 µm on the right side of the low-refractive-index wedge 33, as shown by reference number 22. Between the left side and the right side of the low-refractive-index wedge 33 the width of the wedge 33 increases linearly from 3 µm to 8 µm.

The wedge angle is very small. The distance from the left side to the right side of the wedge 33 is in the centimeter, and as shown in FIG. 2B, the gap between the quarter wave mirrors 16 and 26 varies from $h_L$=3 µm reference number 12 on the left side to $h_R$=8 µm reference number 22 on the right side, so the wedge angle (rad) is very small and about 5E-4.

Figure 4:
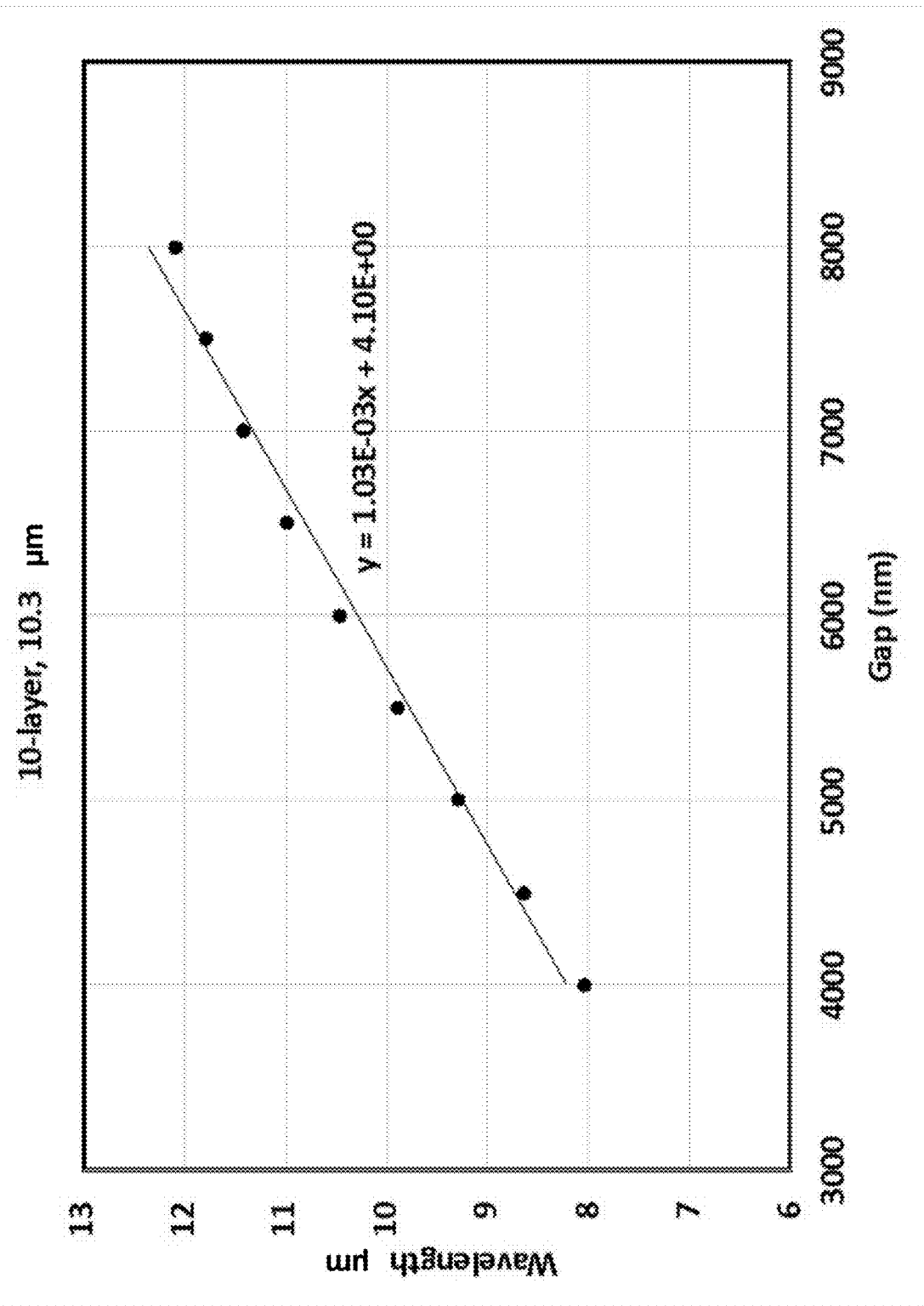
FIG. 4 is a graph of the wavelength of peak transmission as a function of a gap width.

FIG. 4 is a graph of the wavelength of the peak transmission as a function of the gap width from left to right of the low-refractive-index wedge 33 between two quarter wave mirrors 16 and 26 with the thicknesses shown in the second column 76 of FIG. 6. As shown in FIG. 4, the transmission peaks generally have a linear relationship to the air gap widths of 4000 nm=4 µm to 8000 nm=8 µm for a wavelength range of about 4 µm between a wavelength of 8 µm to a wavelength of 12 µm, which is close to the above estimate of 4.3 µm.

In order to tune the transmission peaks over an octave of the spectrum from about 7 µm to about 14 µm, at least two quarter-wave mirror pairs with two different center wavelengths can be used, with each of the quarter-wave mirror pairs covering a half the bandwidth from about 7 µm to 14 µm, or about 3.5 µm bandwidth, which is narrow enough so that it is relatively easy to be in a linear tuning range. For example, a first quarter-wave mirror pair may have the thicknesses as shown in the third column 78 of FIG. 6, which as shown results in a center wavelength of 8.755 µm and a wavelength range from 6.755 µm to 10.755 µm. A second quarter-wave mirror pair may have the thicknesses as shown in the fourth column 80 of FIG. 6, which as shown results in a center wavelength of 12.36 µm and a wavelength range from 10.36 µm to 14.36 µm.

Figure 2B:
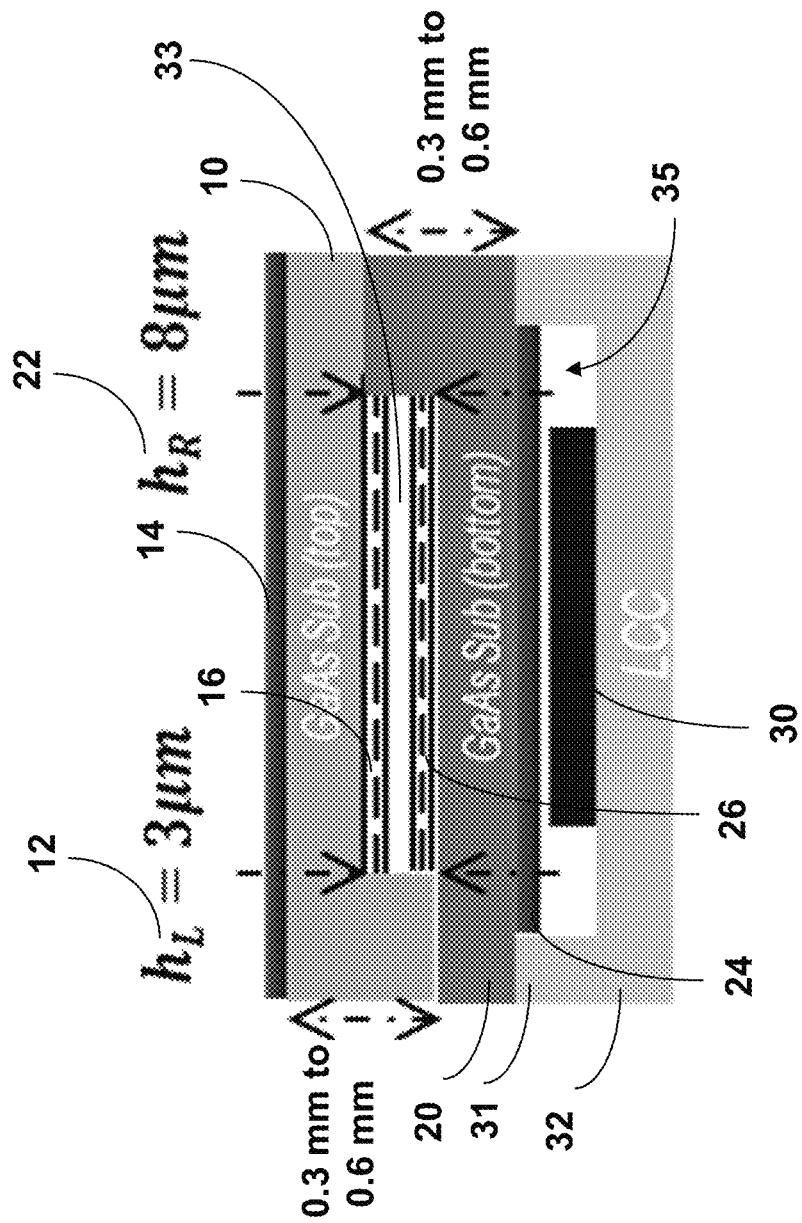
Figure 5A:
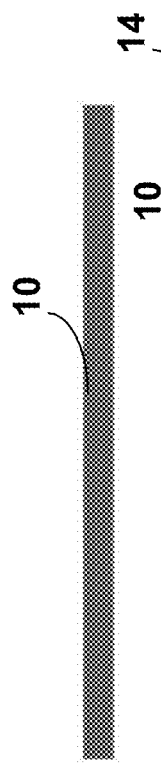
Figure 5B:
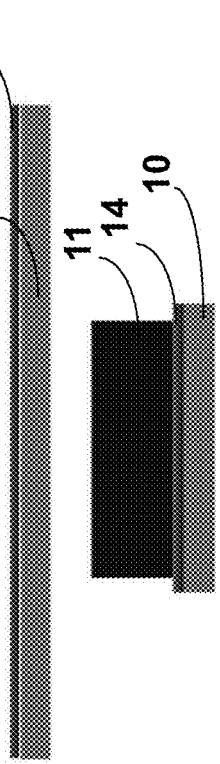
Figure 5C:
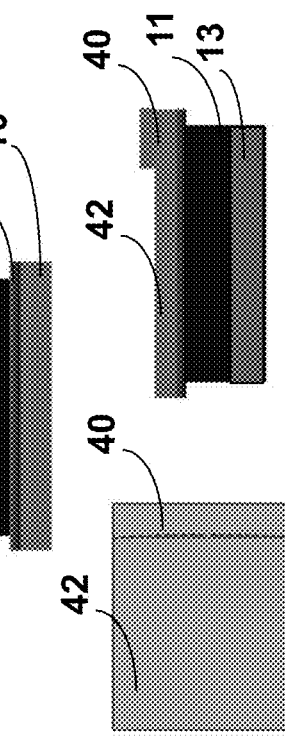
Figure 5D:
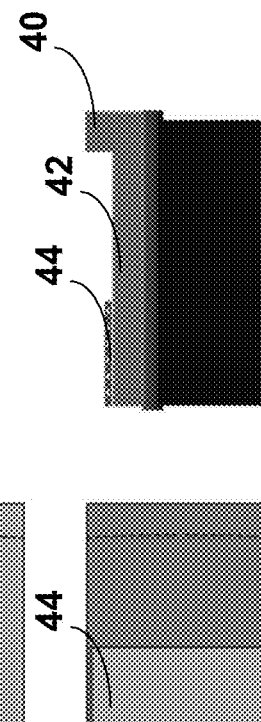
Figure 5E:
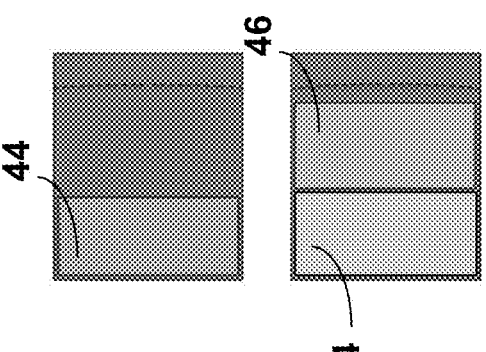
Figure 5F:
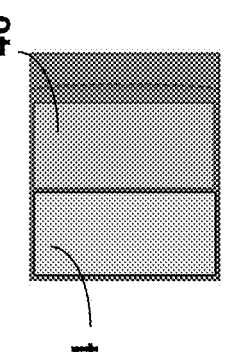
Figure 5M:
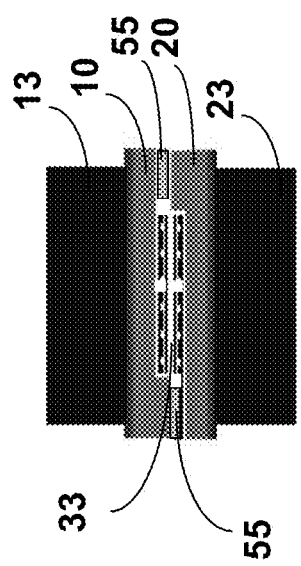
Figure 5N:
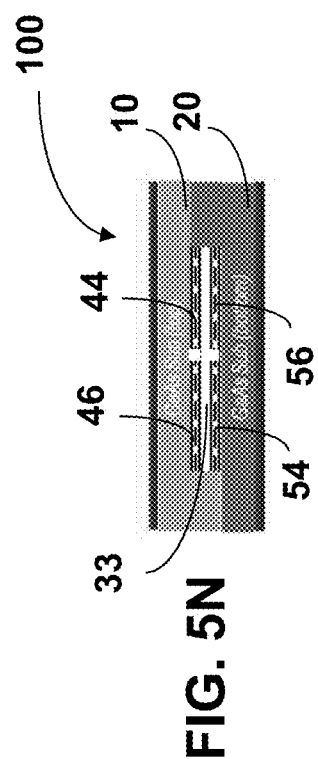
Figure 5O:
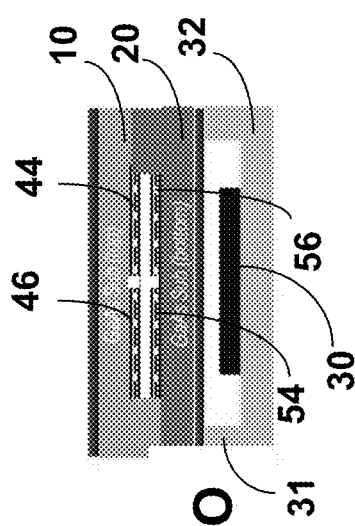

The quarter-wave mirrors 46 and 54, as shown in FIGS. 2C and 5O, together constitute the first quarter-wave mirror pair, which is on the left side of the filter. Each of the quarter-wave mirrors 46 and 54 have the layer thicknesses in the third column 78 of FIG. 6, and each are 8755 nm thick.

Similarly, the quarter-wave mirrors 44 and 56, as shown in FIGS. 2C and 5O, together constitute the second quarter-wave mirror pair, which is on the right side of the filter. Each of the quarter-wave mirrors 44 and 56 have the layer thicknesses in the fourth column 80 of FIG. 6, and each are 12360 nm thick.

FIGS. 5A, 5B, 5C, 5D, 5E, 5F, 5G, 5H, 5I, 5J, 5K, 5L, 5M, 5N, and 5O show a process for fabricating a HSI in accordance with the present disclosure.

In the step shown in FIG. 5A a wafer 10, for example, a 3 inch diameter GaAs wafer, is prepared for an anti-reflection coating (ARC) 14.

Then in the step shown in FIG. 5B, anti reflective coating (ARC) layers 14, which may be approximately 5 µm thick are applied on the wafer. Next in the step shown in FIG. 5C, a resist coating 11 is applied on top of the ARC layers. Then the wafer is diced, for example, into die of 4 cm×4 cm for a 4 cm×4 cm leadless chip carrier. The size of the die depends on the size of a desired leadless chip carrier (LCC) 32. Then a handler 13 may be adhered to the resist to assist with handling the die. The handler 13 may be adhered with a temporary adhesive, such as wax.

Next, as shown in the step of FIG. 5D, which shows top and side views, a layer 42 of a portion of the wafer 10 is thinned, so that area 40 is higher than area 42 by 3 µm to 4 µm. This may be performed using a diamond polishing tool (DPT). The thinning area 42 is not critical as long as it is large enough to overlap and cover the size of the FPA, which may for example have an area of 2 cm×2 cm, with additional margin around the sides, which may be for example 5 mm.

Then as shown in the step of FIG. 5E, on the left side of the thinned area 42 a quarter-wave mirror 44 is formed. The left side quarter-wave mirror 44 may have GE 70 and ZNS 72 layers with the thickness shown in the third column 78 in the table of FIG. 6. Note that the layers in the third column 78 of FIG. 6 have thicknesses that are 85% percent of the thicknesses shown in the second column 76 of FIG. 6. This is because the layer thicknesses in the second column 76 of the table shown in FIG. 6 are designed for a center wavelength of about 10.3 µm. The center wavelength of the quarter-wave mirror 44 is designed to have a center wavelength of about 8.755 µm. The rectangular shape of the quarter-wave mirror 44 may have a length along its long dimension, for example 2.5 cm, to be longer than the width the FPA in order to overlap the FPA 30 in that dimension, which may for example be 2 cm in length. The length along the short dimension of the quarter-wave mirror 44 may be about half of the length along its long dimension, so for example the length of the short dimension may be 1.25 cm, because the right side quarter wave mirror 46, shown in FIG. 5F, may also be 1.25 cm in length, for a total of 2.5 cm, which again provides for overlap of the FPA 30. An edge of the long dimension of each quarter-wave mirror 44 and 46 is aligned with the center line of the FPA.

Next in the step shown in FIG. 5F, on the right side of the thinned area 42 a quarter-wave mirror 46 is formed. The right side quarter-wave mirror 46 may have GE 70 and ZNS 72 layers with the thickness shown in the fourth column 80 in the table of FIG. 6. Note that the layers in the fourth column 80 of FIG. 6 have thicknesses that are 120% percent of the thicknesses shown in the second column 76 of FIG. 6. This is because the layer thicknesses in the second column 76 of the table shown in FIG. 6 are designed for a center wavelength of about 10.3 µm. The center wavelength of the quarter-wave mirror 46 is designed to have a center wavelength of about 12.36 µm. The rectangular shape of the quarter-wave mirror 46 has a length along a long dimension, which may be 2.5 cm long, to be longer and to overlap the width of the FPA, which in this example is 2 cm long. The length along the short dimension of the quarter wave mirror 46 may be about half of the length along its long dimension, so for example 1.25 cm. Moreover, the edge of the quarter-wave mirror 46 has an edge of the long dimension aligned with the long edge of the quarter wave mirror 44. Thus together the quarter-wave mirror 44 and the quarter-wave mirror 46 have a length of 2.5 cm and a width of 2.5 cm and therefore overlap and cover the FPA.

Then the steps described above relative to FIGS. 5A, 5B, 5C, 5D, 5E and 5F are repeated to form quarter wave mirrors 54 and 56 on a thinned area 52 of a second substrate 20, as shown in FIGS. 5G, 5H, 5I, 5J, 5K and 5L. The only difference is the thinning or lapping depth in the step shown in FIG. 5J. The thinning depth for area 52 is made to be about 8 µm lower than the area 50, rather than the thinning depth of 3 µm to 4 µm for the thinned area 42. This is done so that as the substrate 10 and substrate 20 are aligned together, as shown in FIG. 5M, a low-refractive-index wedge 33 is automatically formed between the substrate 10 and the substrate 20, as best shown in FIG. 2B.

For completeness, a detailed description of the steps shown in FIGS. 5G, 5H, 5I, 5J, 5K and 5L follows.

In the step shown in FIG. 5G a wafer 20, for example, a 3 inch GaAs wafer, is prepared for an anti-reflection coating (ARC) 24.

Then in the step shown in FIG. 5H, ARC coating layers 24, which may be approximately 5 µm thick are applied on the wafer. Next in the step shown in FIG. 5I, a resist coating 22 is applied on top of the ARC layers. Then the wafer is diced, for example, into die of 4 cm×4 cm for a 4 cm×4 cm leadless chip carrier. The size of the die depends on the size of a desired leadless chip carrier (LCC) 32. Then a handler 23 may be adhered to the resist to assist with handling the die. The handler 23 may be adhered with a temporary adhesive, such as wax.

Next, as shown in the step of FIG. 5J which shows top and side view, a layer 52 of a portion of the wafer 20 is thinned, so that area 50 is higher than area 52 by 8 µm. This may be performed using a diamond polishing tool (DPT). The thinning area 52 is not critical as long as it is large enough to overlap and cover the size of the FPA, which may for example have an area of 2 cm×2 cm, with additional margin around the sides, which may be for example 5 mm.

Then as shown in the step of FIG. 5K, on the left side of the thinned area 52 a quarter-wave mirror 54 is formed. The left side quarter-wave mirror 54 may have GE 70 and ZNS 72 layers with the thickness shown in the fourth column 80 in the table of FIG. 6. Note that the layers in the fourth column 80 of FIG. 6 have thicknesses that are 120% percent of the thicknesses shown in the second column 76 of FIG. 6. This is because the layer thicknesses in the second column 76 of the table shown in FIG. 6 are designed for a center wavelength of about 10.3 µm. The center wavelength of the quarter-wave mirror 54 is designed to have a center wavelength of about 12.36 μm. The rectangular shape of the quarter-wave mirror 54 may have a length along its long dimension, for example 2.5 cm, to be longer than the width the FPA in order to overlap the FPA 30 in that dimension, which may for example be 2 cm in length. The length along the short dimension of the quarter-wave mirror 54 may be about half of the length along its long dimension, so for example the length of the short dimension may be 1.25 cm, because the right side quarter wave mirror 56, shown in FIG. 5L, may also be 1.25 cm in length, for a total of 2.5 cm, which again provides for overlap of the FPA 30. An edge of the long dimension of each quarter-wave mirror 54 and 56 is aligned with the center line of the FPA.

Next in the step shown in FIG. 5L, on the right side of the thinned area 52 a quarter-wave mirror 56 is formed. The right side quarter-wave mirror 56 may have GE 70 and ZNS 72 layers with the thickness shown in the third column 78 in the table of FIG. 6. Note that the layers in the third column 78 of FIG. 6 have thicknesses that are 85% percent of the thicknesses shown in the second column 76 of FIG. 6. This is because the layer thicknesses in the second column 76 of the table shown in FIG. 6 are designed for a center wavelength of about 10.3 μm. The center wavelength of the quarter-wave mirror 56 is designed to have a center wavelength of about 8.755 μm. The rectangular shape of the quarter-wave mirror 56 has a length along a long dimension, which may be 2.5 cm long, to be longer and to overlap the width of the FPA, which in this example is 2 cm long. The length along the short dimension of the quarter wave mirror 56 may be about half of the length along its long dimension, so for example 1.25 cm. Moreover, the edge of the quarter-wave mirror 56 has an edge of the long dimension aligned with the long edge of the quarter wave mirror 54. Thus together the quarter-wave mirror 54 and the quarter-wave mirror 56 have a length of 2.5 cm and a width of 2.5 cm and therefore overlap and cover the FPA.

Then, in the step shown in FIG. 5M, the substrate 10 and the substrate 20 are bonded together by touching epoxy 55 to the edges of the substrates, so that raised area 40 on substrate 10 is bonded to the thinned area 52 of substrate 20, and so that raised area 50 on substrate 20 is bonded to the thinned area 42 of substrate 10. This forms the low-refractive-index wedge 33 between the first quarter wave mirror pair 46 and 54 and the second quarter wave mirror pair 44 and 56, as shown in FIG. 5N. Then in the step shown in FIG. 5N, the handlers 13 and 23, the resists 11 and 22, and the temporary adhesive, such as wax, are removed, to complete the thin film filter 100.

Finally, in the step shown in FIG. 5O, the resulting thin-film filter is bonded on top of the leadless chip carrier (LCC) 32 with the FPA 30 in the LCC cavity. The bonding may be by touching epoxy at the edges between the top 31 of LCC 32 and the thin-film filter 100.

In FIGS. 2C and 5O and the related description above, two filters in the device are described to cover a wide range of wavelengths. The invention is not limited to two filters and more filters can be used in the same manner to achieve other ranges of wavelengths.

Figure 3:
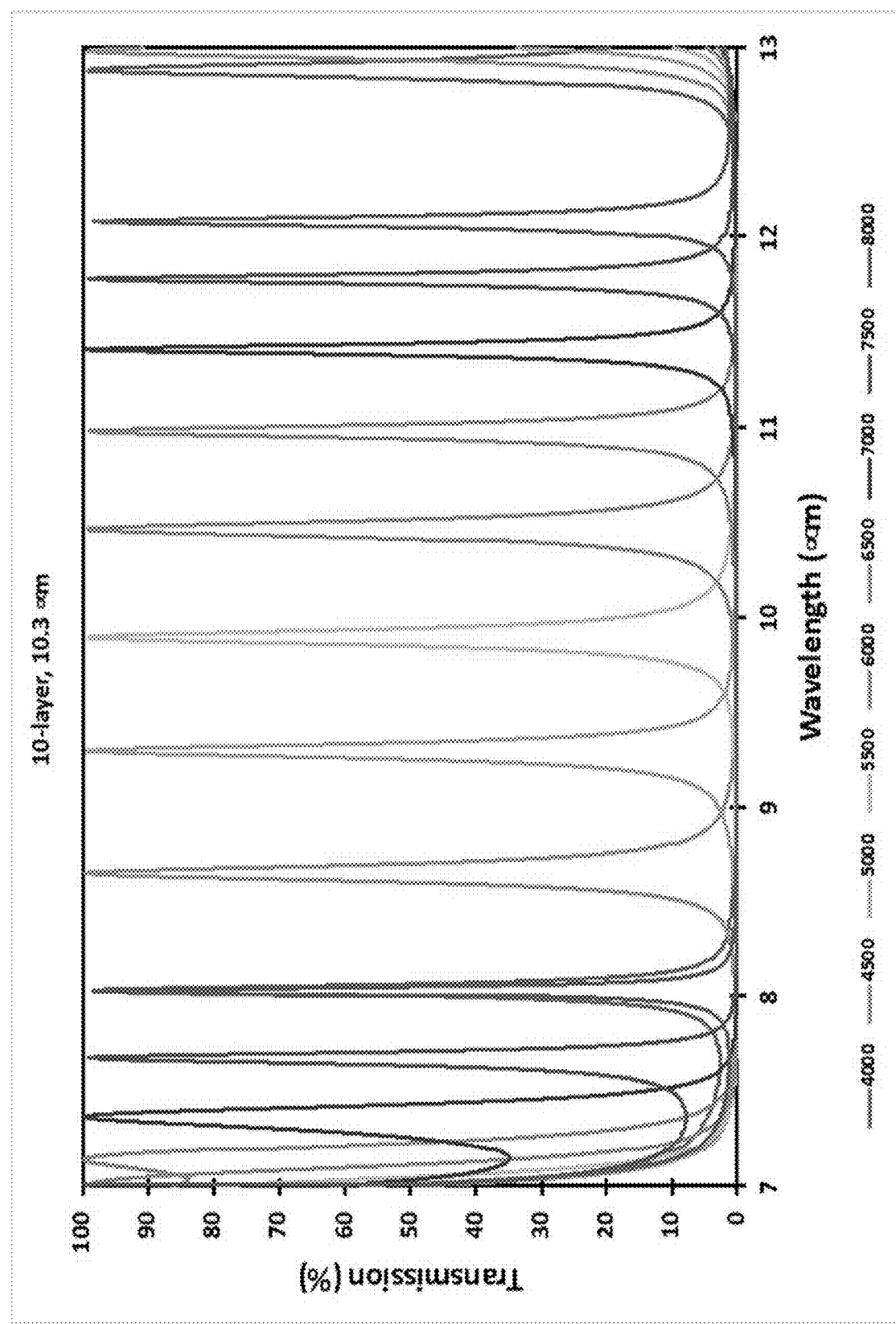
FIG. 3 shows simulated transmissions as a function of wavelength at nine different gap widths, namely 4 µm, 4.5 µm, 5 µm, 5.5 µm, 6.0 µm, 6.5 µm, 7 µm, 7.5 µm, and 8 µm in accordance with the present disclosure.

Although the simulation such as the transmission spectrum shown in FIG. 3 provides the spectrum resolution, it is simulated in the ideal condition. There are uncertainties in reality that are not included in the simulation. These uncertainties include the roughness of the substrate due to any bowing and a non-ideal reflection due to the uncertainty of the refractive index of the material. These can lead to a reduction in resolution. There are other factors such as the imaging optics, and the distance between the substrate and the FPA that may also lead to degradation of the spectral resolution. Calculations were performed to provide more realistic estimations of these effects on the spectral resolution. A normalized spectral resolution of 1%, i.e., $\delta\lambda/\lambda_O$ was used as the guideline in evaluating these effects, which are summarized in the Table shown in FIG. 7.

The mechanism of each factor's effect on the spectral resolution is summarized in the middle column of FIG. 7. The third column of FIG. 7 gives a quantitative estimation on the constraints of each factor. For example, one can read from the third column that in order to achieve the 1% normalized resolution, one needs $R \geq 0.97$, $\delta d \leq 50$ nm, F #$\geq 7$, $D \leq 3$ mm.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . ." and no method or process step herein is to be construed under those provisions unless the step, or steps, are expressly recited using the phrase "comprising the step(s) of . . .".

What is claimed is:

1. A hyperspectral imager (HSI) comprising:
   a first wedged interference filter, the first wedged interference filter comprising:
   a first quarter wave mirror;
   a second quarter wave mirror; and
   a low-refractive-index wedge between the first quarter wave mirror and the second quarter wave mirror;
   wherein the low-refractive-index wedge has a height dimension such that a distance between the first quarter wave mirror and the second quarter wave mirror increases linearly along a length of the low-refractive-index wedge;
   wherein:

the first quarter wave mirror comprises:
a first substrate;
a plurality of first thin film layers on the first substrate; and
a plurality of second thin film layers on the first substrate;
wherein the plurality of first thin film layers are interleaved with the plurality of second thin film layers; and
the second quarter wave mirror comprises:
a second substrate;
a plurality of third thin film layers on the second substrate; and
a plurality of fourth thin film layers on the second substrate;
wherein the plurality of third thin film layers are interleaved with the plurality of fourth thin film layers;
the hyperspectral imager (HSI) further comprising:
a second wedged interference filter, the second wedged interference filter comprising:
a third quarter wave mirror on the first substrate; and
a fourth quarter wave mirror on the second substrate;
wherein the low-refractive-index wedge is also between the third quarter wave mirror and the fourth quarter wave mirror;
wherein the low-refractive-index wedge has a lower refractive index than a refractive index of the third quarter wave mirror, and has a lower refractive index than a refractive index of the fourth quarter wave mirror;
wherein the first quarter wave mirror and the third quarter wave mirror are next to one another on the first substrate; and
wherein the second quarter wave mirror and the fourth quarter wave mirror are next to one another on the second substrate.

2. The hyperspectral imager (HSI) of claim 1 further comprising:
a chip carrier; and
a focal plane array coupled to the chip carrier;
wherein the first wedged interference filter is coupled to the chip carrier and positioned over the focal plane array.

3. The hyperspectral imager (HSI) of claim 1 wherein:
the low-refractive-index wedge has a lower refractive index than a refractive index of the first thin film layers, and has a lower refractive index than a refractive index of the second thin film layers, and has a lower refractive index than a refractive index of the third thin film layers, and has a lower refractive index than a refractive index of the fourth thin film layers.

4. The hyperspectral imager (HSI) of claim 1 wherein:
the first substrate and the second substrate comprise GaAs;
the plurality of first thin film layers and the plurality of third thin film layers comprise germanium (Ge); and
the plurality of second thin film layers and the plurality of fourth thin film layers comprise zinc sulfide (ZnS).

5. The hyperspectral imager (HSI) of claim 1 wherein:
the first quarter wave mirror has a first center wavelength determined by a sum of thicknesses of the plurality of first thin film layers and thicknesses of the plurality of second thin film layers; and
the first quarter wave mirror has a range of wavelengths determined by a refractive index contrast $$\frac{\Delta\lambda}{\lambda_c} = \frac{4}{\pi}\sin^{-1}\left(\frac{n_H - n_L}{n_H + n_L}\right),$$

wherein $n_H$ is a refractive index for a material of the first thin film layers; and
wherein $n_L$ is a refractive index for a material of the second thin film layers; and
the second quarter wave mirror has a second center wavelength determined by a sum of thicknesses of the plurality of third thin film layers and thicknesses of the plurality of fourth thin film layers; and
the second quarter wave mirror has a range of wavelengths determined by a refractive index contrast $$\frac{\Delta\lambda}{\lambda_c} = \frac{4}{\pi}\sin^{-1}\left(\frac{n_H - n_L}{n_H + n_L}\right),$$

wherein $n_H$ is a refractive index for a material of the third thin film layers; and
wherein $n_L$ is a refractive index for a material of the fourth thin film layers; and
wherein the first center wavelength is the same as the second center wavelength; and
wherein the first range of wavelengths is the same as the second range of wavelengths.

6. The hyperspectral imager (HSI) of claim 1 wherein:
the third quarter wave mirror comprises:
a plurality of fifth thin film layers on the first substrate; and
a plurality of sixth thin film layers on the first substrate;
wherein the plurality of fifth thin film layers are interleaved with the plurality of sixth thin film layers; and
the fourth quarter wave mirror comprises:
a plurality of seventh film layers on the second substrate; and
a plurality of eighth thin film layers on the second substrate;
wherein the plurality of seventh thin film layers are interleaved with the plurality of eighth thin film layers.

7. The hyperspectral imager (HSI) of claim 6 wherein:
the plurality of fifth thin film layers and the plurality of seventh thin film layers comprise germanium (Ge); and
the plurality of sixth thin film layers and the plurality of eighth thin film layers comprise zinc sulfide (ZnS).

8. The hyperspectral imager (HSI) of claim 6 wherein:
the third quarter wave mirror has a third center wavelength determined by a sum of thicknesses of the plurality of fifth thin film layers and thicknesses of the plurality of sixth thin film layers; and
the third quarter wave mirror has a range of wavelengths determined by a refractive index contrast $$\frac{\Delta\lambda}{\lambda_c} = \frac{4}{\pi}\sin^{-1}\left(\frac{n_H - n_L}{n_H + n_L}\right),$$

wherein $n_H$ is a refractive index for a material of the fifth thin film layers; and
wherein $n_L$ is a refractive index for a material of the sixth thin film layers; and
the fourth quarter wave mirror has a fourth center wavelength determined by a sum of thicknesses of the plurality of seventh thin film layers and thicknesses of the plurality of eighth thin film layers; and the fourth quarter wave mirror has a range of wavelengths determined by a refractive index contrast $$\frac{\Delta\lambda}{\lambda_c} = \frac{4}{\pi}\sin^{-1}\left(\frac{n_H - n_L}{n_H + n_L}\right),$$

wherein $n_H$ is a refractive index for a material of the seventh thin film layers; and wherein $n_L$ is a refractive index for a material of the eighth thin film layers; and wherein the third center wavelength is the same as the fourth center wavelength;

wherein the third range of wavelengths is the same as the fourth range of wavelengths; and wherein the third center wavelength and the fourth center wavelength are different than the first center wavelength and the second center wavelength.

9. The hyperspectral imager (HSI) of claim 1 wherein:

the first quarter wave mirror and the second quarter wave mirror have a first center wavelength and a first range of wavelengths;

the third quarter wave mirror and the fourth quarter wave mirror have a second center wavelength and a second range of wavelengths; and the first center wavelength, the first range of wavelengths, the second center wavelength, the second range of wavelengths are such that a sum of the first range of wavelengths and the second range of wavelength covers a continuous octave of long wavelength infrared (LWIR) wavelengths.

10. A method for providing a hyperspectral imager (HSI) comprising:

providing a first wedged interference filter, the method of providing a first wedged interference filter comprising:

providing a first quarter wave mirror;

providing a second quarter wave mirror; and providing a low-refractive-index wedge between the first quarter wave mirror and the second quarter wave mirror;

wherein the low-refractive-index wedge has a height dimension such that a distance between the first quarter wave mirror and the second quarter wave mirror increases linearly along a length of the low-refractive-index wedge;

wherein providing the first quarter wave mirror comprises:

providing a first substrate;

providing a plurality of first thin film layers on the first substrate; and providing a plurality of second thin film layers on the first substrate;

wherein the plurality of first thin film layers are interleaved with the plurality of second thin film layers; and providing the second quarter wave mirror comprises:

providing a second substrate;

providing a plurality of third thin film layers on the second substrate; and providing a plurality of fourth thin film layers on the second substrate;

wherein the plurality of third thin film layers are interleaved with the plurality of fourth thin film layers;

the method further comprising:

providing a second wedged interference filter, wherein providing the second wedged interference filter comprises:

providing a third quarter wave mirror on the first substrate; and providing a fourth quarter wave mirror on the second substrate;

wherein the low-refractive-index wedge is between the third quarter wave mirror and the fourth quarter wave mirror;

wherein the low-refractive-index wedge has a lower refractive index than a refractive index of the third quarter wave mirror, and has a lower refractive index than a refractive index of the fourth quarter wave mirror;

wherein the first quarter wave mirror and the third quarter wave mirror are next to one another on the first substrate; and wherein the second quarter wave mirror and the fourth quarter wave mirror are next to one another on the second substrate.

11. The method of claim 10 wherein:

the low-refractive-index wedge has a lower refractive index than a refractive index of the first thin film layers, and has a lower refractive index than a refractive index of the second thin film layers, and has a lower refractive index than a refractive index of the third thin film layers, and has a lower refractive index than a refractive index of the fourth thin film layers.

12. The method of claim 10 wherein:

the first substrate and the second substrate comprise GaAs;

the plurality of first thin film layers and the plurality of third thin film layers comprise germanium (Ge); and the plurality of second thin film layers and the plurality of fourth thin film layers comprise zinc sulfide (ZnS).

13. The method of claim 10 wherein:

providing the third quarter wave mirror comprises:

providing a plurality of fifth thin film layers on the first substrate; and providing a plurality of sixth thin film layers on the first substrate;

wherein the plurality of fifth thin film layers are interleaved with the plurality of sixth thin film layers; and providing the fourth quarter wave mirror comprises:

providing a plurality of seventh film layers on the second substrate; and providing a plurality of eighth thin film layers on the second substrate;

wherein the plurality of seventh thin film layers are interleaved with the plurality of eighth thin film layers.

14. The method of claim 13 wherein:

the plurality of fifth thin film layers and the plurality of seventh thin film layers comprise germanium (Ge); and the plurality of sixth thin film layers and the plurality of eighth thin film layers comprise zinc sulfide (ZnS).

15. The method of claim 10 wherein:

the first quarter wave mirror and the second quarter wave mirror have a first center wavelength and a first range of wavelengths;

the third quarter wave mirror and the fourth quarter wave mirror have a second center wavelength and a second range of wavelengths; and the first center wavelength, the first range of wavelengths, the second center wavelength, the second range of wavelengths are such that a sum of the first range of wavelengths and the second range of wavelength covers a continuous octave of long wavelength infrared (LWIR) wavelengths.

\* \* \* \* \*